(12) United States Patent
Zhao et al.

(10) Patent No.: US 7,573,860 B2
(45) Date of Patent: Aug. 11, 2009

(54) METHOD, DEVICE AND SYSTEM FOR DETERMINING A TRANSMISSION POWER FOR ARQ RELATED RE-TRANSMISSIONS

(75) Inventors: Zhuyan Zhao, Beijing (CN); Hongmming Zheng, Beijing (CN); Hao Guan, Beijing (CN)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 10/534,011

(22) PCT Filed: Nov. 5, 2002

(86) PCT No.: PCT/IB02/04618

§ 371 (c)(1),
(2), (4) Date: Apr. 24, 2006

(87) PCT Pub. No.: WO2004/042992

PCT Pub. Date: May 21, 2004

(65) Prior Publication Data

US 2006/0268880 A1  Nov. 30, 2006

(51) Int. Cl.
*H04B 7/216* (2006.01)
(52) U.S. Cl. .............. 370/342; 370/95.1; 370/206; 370/335; 370/441
(58) Field of Classification Search .............. 370/95.1, 370/95.2, 206–209, 252, 335, 441
See application file for complete search history.

(56) References Cited

U.S. PATENT DOCUMENTS

| | | | |
|---|---|---|---|
| 5,828,677 A * | 10/1998 | Sayeed et al. ............. 714/774 |
| 5,914,950 A * | 6/1999 | Tiedemann et al. ......... 370/348 |
| 6,266,360 B1 * | 7/2001 | Okamoto ................... 375/140 |
| 6,385,437 B1 * | 5/2002 | Park et al. ................... 455/69 |
| 6,615,382 B1 * | 9/2003 | Kang et al. ................ 714/748 |
| 6,700,867 B2 * | 3/2004 | Classon et al. ............. 370/216 |
| 7,120,134 B2 * | 10/2006 | Tiedemann et al. ......... 370/329 |
| 7,218,667 B2 * | 5/2007 | Arima ........................ 375/148 |
| 2001/0019961 A1 * | 9/2001 | Nakahara et al. ............ 455/522 |

(Continued)

FOREIGN PATENT DOCUMENTS

| | | |
|---|---|---|
| EP | 1244240 | 9/2002 |
| WO | WO 0128127 | 4/2001 |
| WO | WO 0178291 | 10/2001 |

*Primary Examiner*—Ayaz R Sheikh
*Assistant Examiner*—Andrew C Lee
(74) *Attorney, Agent, or Firm*—Alfred A. Fressola; Ware, Fressola, Van Der Sluys & Adolphson LLP

(57) ABSTRACT

The present invention provides a method, a mobile terminal device and a system for determining a transmission power factor. During an uplink of data between a mobile terminal device and a base station via a code division multiple access (CDMA) system supported by automatic repeat request (ARQ) first transmission containing original data and re-transmissions of different order containing supplementary information are communicated. The i-th re-transmissions are based on the automatic repeat request (ARQ). The transmission power factor to be determined is operable with an i-th re-transmission. A first and a second error quantity are obtained from an evaluation of status information items received in accordance with the automatic repeat request (ARQ). The first error quantity and the second error quantity allow for deriving an i-th error ratio so as to calculate a transmission power correction factor.

11 Claims, 6 Drawing Sheets

U.S. PATENT DOCUMENTS

2002/0027897 A1    3/2002  Moulsley et al.
2002/0046379 A1*   4/2002  Miki et al. .................. 714/749
2002/0167907 A1*  11/2002  Sarkar et al. ................ 370/252
2002/0181437 A1*  12/2002  Ohkubo et al. .............. 370/349
2004/0047305 A1*   3/2004  Ulupinar ..................... 370/320

* cited by examiner $Ni \rightarrow$

| | 1 | 2 | 3 | 4 | 5 | ... |
|---|---|---|---|---|---|---|
| 1 | $\|\Delta Pi(1,1)\|$ | $\|\Delta Pi(2,1)\|$ | $\|\Delta Pi(3,1)\|$ | $\|\Delta Pi(4,1)\|$ | $\|\Delta Pi(5,1)\|$ | ... |
| 2 | - | $\|\Delta Pi(2,2)\|$ | $\|\Delta Pi(3,2)\|$ | $\|\Delta Pi(4,2)\|$ | $\|\Delta Pi(5,3)\|$ | ... |
| 3 | - | - | $\|\Delta Pi(3,3)\|$ | $\|\Delta Pi(4,3)\|$ | $\|\Delta Pi(5,3)\|$ | ... |
| 4 | - | - | - | $\|\Delta Pi(4,4)\|$ | $\|\Delta Pi(5,4)\|$ | ... |
| 5 | - | - | - | - | $\|\Delta Pi(5,5)\|$ | ... |
| ⋮ | ⋮ | ⋮ | ⋮ | ⋮ | ⋮ | ⋱ |

$\leftarrow Ki$ $$\left[ \text{Matrix } \left(\frac{M}{2}; \frac{M}{2}\right): \text{abs}(\Delta Pi(Ni, Ki)), \text{ where } Ki \leq Ni \text{ and } Ni \leq \frac{M}{2} \right]$$

Fig. 4a

METHOD, DEVICE AND SYSTEM FOR DETERMINING A TRANSMISSION POWER FOR ARQ RELATED RE-TRANSMISSIONS

CROSS REFERENCE TO RELATED APPLICATIONS

This application is for entry into the U.S. national phase under §371 for International Application No. PCT/IB02/004618 having an international filing date of Nov. 5, 2002 and from which priority is claimed under all applicable sections of Title 35 of the United States Code including, but not limited to, Sections 120, 363 and 365(c).

TECHNICAL FIELD

The present invention relates to a method, a device and a system allowing for determining an adapted transmission power to be employed for re-transmission being initiated on a automatic repeat request (ARQ). Particularly the communication of data is operated via a code division multiple access (CDMA) system.

BACKGROUND OF THE INVENTION

Currently, the enhancement of uplink performance in wideband code division multiple access (WCDMA) of universal mobile telecommunication system (UMTS) is under development. Especially, high speed uplink packet access (HSUPA) is under development and standardization. In combination with this enhancement of uplink performance of mobile WCDMA-enabled terminals (also denoted as user equipment UE, e.g. a mobile UMTS-enabled terminal) communicating to base stations (also denoted as node B) fast hybrid ARQ (automatic response request) is to be employed for increasing the uplink data communication speed as well as the uplink data communication capacity which effects both the individual uplink data communication speed and capacity of a mobile UMTS terminals and the total uplink data communication speed and capacity within the coverage of a base station.

In wideband code division multiple access (WCDMA) several individual in principle independent information parts are combined using channelization procedures and scrambling procedures, respectively, to communicate these information parts at the same time via one physical channel (i.e. within one frequency band). Channelization procedures and scrambling procedures are operated in such a manner, respectively, that the individual information parts are separately obtainable at the receiving side by inverse channelization procedures and inverse scrambling procedures, respectively. In general, a channelization procedure serves to combine (or code) several individual information parts of for example one mobile WCDMA-enabled terminal whereas a scrambling procedure serves to allow a differentiation of signals generated and transmitted by for example different mobile WCDMA-enabled terminals.

From the energy point of view the all signals referring to the aforementioned information parts are superimposed in the same frequency band at the same time and consequently each signal power adds to the total signal power transmitted within the same frequency band. But unfortunately the total signal power transmitted and the interference and noise power are associated with each other. Therefore and due to other reasons power control is essential in code division multiple access (CDMA) systems and hence also in wideband code division multiple access (WCDMA) systems.

A first main concern addressed by power control is denoted as the near-far problem. In case of several transmitting CDMA-enabled terminals being spaced at different intervals from a receiving base station the nearby transmitting CDMA-enabled terminal may overpower remote transmitting CDMA-enabled terminals since the signals of all the transmitting CDMA-enabled terminals are superimposed in the same frequency band at the same time. A second main concern affects the Raleigh fading of physical transmission channels which may be a result of multi-path propagation. Two main techniques are involved in the power control for transmission signals in wideband code division multiple access (WCDMA) systems, the open-loop power control and the closed-loop power control.

Open-loop power control allows a terminal for estimating required-transmission power based on the signal power received from the base station and information about the original transmit power of the base station. This results to a rough estimation of the required transmission power.

Closed-loop power control allows a receiver (either a terminal or a base station) to command a transmitter (either a base station or a terminal) to adjust the transmission power. Commands for adjusting the transmission power are based on signal-to-interference ratio (SIR) measurements carried out on the receiving side. The closed-loop power control is aimed at adjusting the transmission power such that the measured SIR value is as close as possible to a pre-determined target SIR value. These commands are transmitted on physical control channels associated with physical data channels in each time slot corresponding to a data packet (in case of 15 time slots per each 10 ms 1500 times per second).

Additionally, a quality of service based power control technique is also employed in order to maintain a required or desired level of the quality of service (for example an effective data rate for a real-time application). In general, a maintaining of a required or desired level of the quality of service is reached by maintaining a SIR value at a corresponding level at the receiving side. However, the target SIR value is a function of the quality of service, for example in case the quality of service is expressed in terms of a frame error rate (FER) on the air interface the target SIR value is a function of the FER. A service such as a speech service or a data service of low or high data rate determines the acceptable FER and therefore the target SIR. The outer-loop power control allows for varying the target SIR in accordance with a quality of service requirement which indirectly concerns the transmission power by affecting the closed-loop power control.

Besides the above presented power control further quality of service enhancing features are applied in cellular communication systems and hence particularly in wideband code division multiple access (WCDMA) systems. Adaptive modulation and coding schemes (AMC) provide the flexibility to adapt individually the modulation and coding scheme of data to average channel conditions for each transmitter within a certain transmission time frame. Adaptive modulation and coding (AMC) is based on an explicit carrier-to-interference ratio (C/I) measurement or related measurements. Traditionally in CDMA systems (and hence also in WCDMA systems) fast power control is preferably employed to adapt data transmission to varying link (channel) conditions.

Hybrid automatic repeat request (H-ARQ) is an implicit link adaptation technique. In H-ARQ, link layer acknowledgements are used for re-transmission decisions. There are many schemes for implementing H-ARQ-chase combining, rate compatible punctured turbo codes and incremental redundancy (IR). Incremental redundancy (IR) or H-ARQ type II is another implementation of the H-ARQ technique wherein instead of sending simple repeats of the entire coded packet, additional redundant information is incrementally transmitted if the decoding fails on the first attempt.

H-ARQ type-III also belongs to the class of incremental redundancy (IR) ARQ schemes. However, with H-ARQ type III, each retransmission is self-decodable which is not the case with H-ARQ-type II. Chase combining (also called H-ARQ type III with one redundancy version) involves the retransmission by the transmitter of the same coded data packet. The decoder at the receiver combines these multiple copies of the transmitted packet weighted by the received signal-to-noise ratio (SNR). Diversity (time) gain is thus obtained. In the H-ARQ type-III with multiple redundancy version different puncture bits are used in each retransmission.

Currently in H-ARQ leaving aside aforementioned power control adaptation, the re-transmission power of data packets is equal to the transmission power of the original (corrupt) data packet. For example, in case of an implementation of H-ARQ type I with chase combining, the original data packet and the (first) re-transmitted data packet are combined at the receiving side under consideration of their respective received SNR values (weighted by their received SNR values). That is from energy point of view, the energy of the original data packet and the energy of the (first) re-transmitted data packet are added (combined) weighted by their SNR values. The resulting combined data packet has a combined SNR value corresponding to the SNR values. In case the combined SNR value is lower than a decode threshold value decoding of the combined data packet is not possible and a new re-transmission for combining is required. In the other case the combined data packet having a combined SNR value being equal or exceeding the decode threshold value is decodable. The exceeding of the combined SNR value above the required decode threshold value is not necessary for decoding and limits the performance of data communication.

SUMMARY OF THE INVENTION

The object of the invention is to provide at least one method for adjusting the transmission power of a data re-transmission due to an automatic repeat request (ARQ). The object of the invention is achieved with a method for adjusting the power of re-transmission, corresponding devices adapted to perform this method, a computer program and a software tool which are disclosed in the independent claims. Additional embodiments of the invention are disclosed in the dependent claims.

The method for adjusting the transmission power of an uplink re-transmission caused by an automatic repeat request (ARQ) according to an embodiment of the invention overcomes the above described state of the art problems, especially the unnecessary exceeding of the combined SNR value and provides a couple of advantages resulting therefrom. The transmission power of the re-transmission(s) is adapted with reference to the channel conditions and the basic adjustment algorithm allows for fast optimizing the transmission power of data re-transmissions in a flexible way by varying transmission power in a range from zero power deduction relative to the original transmission power to a maximal reduced power allowed in the system, wherein the method is based on available information and does not require any additional signaling. The optimized transmission power of data re-transmissions results in an efficient signal energy per bit divided by noise spectral energy ($E_b/N_0$) operation in code division multiple access (CDMA) and particularly in wideband code division multiple access (WCDMA) systems. The signal energy per bit divided by noise spectral energy ($E_b/N_0$) defines a value that is required to meet a predefined quality of service (e.g. bit error rate), wherein the noise includes both thermal noise and interference. An efficient $E_b/N_0$ operation results in an efficient communication link operation and an overall efficient operation of a communication cell (e.g. relating to data rate).

According to an embodiment of the invention, a method for determining a transmission power factor being operable with an i-th re-transmission during an uplink data transmission between a mobile terminal device and a base station via a code division multiple access (CDMA) system and employing an automatic repeat request (ARQ) is provided. The uplink data transmission is operated in a sequence of first transmissions and i-th re-transmissions, wherein the first transmissions comprises data packets containing the original data divided upon a plurality of data packets to be transmitted to the base station and the i-th re-transmissions containing information relating to the automatic repeat request.

The mobile terminal device receives a pre-defined number of status information items generated by an automatic repeat request (ARQ) process operated on the base station. A single status information items informs the mobile terminal device whether data packets transmitted from the mobile terminal device and received by the base station a certain data packet is decodable or not decodable. Therefore, each status information item contains at least either an acknowledgement (ACK) item or a non-acknowledgement (NACK) item. An acknowledgement item confirms the ability of decoding whereas a non-acknowledgement item indicates that the data packet is not decodable. Further, a non-acknowledgement item may instruct the mobile communication device to transmit supplementary information items to the base station which is denoted as re-transmission. To each original data packet (first transmission of a data packet) one or more supplementary information items may be transmitted to the base station each of it instructed by a separate non-acknowledgement item. The one or more re-transmissions corresponding to a certain first transmission are numbered, denoted as i-th re-transmissions (i=1, 2, 3, . . . ).

A first error quantity is determined from the received status information items wherein the first error quantity is equal to a number of i-th re-transmissions and a second error quantity is determined from the received status information items wherein the second quantity is equal to a number of i-th re-transmissions being responded by status information items each containing a non-acknowledgement item.

An error ratio is derived from the first error quantity and the second error quantity and a transmission power factor is determined from a current valid transmission power factor and a transmission power correction factor such that a difference between the error ratio and a pre-defined target error ratio is minimized. This new transmission power factor is operable with i-th re-transmissions.

According to an embodiment of the invention, deviation value is obtained from the error ratio from the pre-defined target error ratio. In case the first error quantity is unequal to zero or the obtained deviation value exceeds a pre-defined deviation level the transmission power correction factor and the transmission power factor basing on the transmission power correction factor is further determined in order to minimize the deviation value. The transmission power correction factor is depending on at least a transmission power correction step value, the first error quantity, the second error quantity and the pre-defined target error ratio. In case deviation value does not exceeds the pre-defined deviation level a current valid transmission power factor is maintained.

According to an embodiment of the invention, the transmission power correction factor is determined such that in case of the error ratio being greater than the pre-defined target error ratio the transmission power factor is increased and in case the error ratio being smaller than the pre-defined target error ratio the transmission power factor is decreased.

According to an embodiment of the invention, the error ratio is a quotient of the second error quantity and the first error quantity and is separately determined for each i-th retransmission resulting in a set of i-th error ratios each associated to the corresponding i-th retransmission.

According to an embodiment of the invention, the deviation value is an absolute variation value of a difference between the i-th error ratio and the pre-defined target error ratio. The pre-defined deviation level with which the deviation value is compared is a pre-defined system parameter.

According to an embodiment of the invention, the pre-defined deviation level which is a pre-defined system parameter depends on the pre-defined target error ratio the and particularly, the pre-defined deviation level is directly proportional to the pre-defined target error ratio. More particularly, the pre-defined deviation level is equal to the half of the pre-defined target error ratio.

According to an embodiment of the invention, the transmission power factor is a transmission power reduction factor. This transmission power reduction factor is defined relative to a transmission power which is employed for transmitting original data packets (first transmission).

The aforementioned transmission power employed for transmitting original data packets is to be understood not to be modified due to further power control mechanisms. Power control mechanism may be implemented to optimize the total communication transmission power of communications over the physical channels operating independently to the "kind of data communication". That is, in case such further power control mechanism(s) is (are) implemented, such as open-loop power control mechanism or closed-loop power control mechanism, the transmission power modification due to power control mechanism(s) is to be employed after taken the power transmission adjustment according to an embodiment of the present invention into consideration.

According to an embodiment of the invention, the pre-defined target error ratio and the i-th target error rate is a target frame error ratio (target FER) and a i-th target frame error rate of the i-th retransmission, respectively.

According to an embodiment of the invention, the transmission power correction factor is a product of a first factor, a second factor and a third factor. The value of the first factor is either equal to +1 or equal to −1. That is, the first factor defines the sign of the transmission power correction. The second factor is represented by following mathematical denotation:

$$\left( \frac{C_{Ni}^{Ki} \cdot FER^{Ki}(1 - FER)^{Ni-Ki}}{FER} \right)^{-1},$$

where $C_{Ni}^{Ki}$ is a binomial coefficient, FER is the pre-defined target error ratio, Ni is the first error quantity and Ki is the second error quantity. Particularly, the binomial coefficient $C_{Ni}^{Ki}$ may be expressed also as $$C_{Ni}^{Ki} = \binom{Ni}{Ki} = \frac{Ni!}{Ki! \cdot (Ni - Ki)!}.$$

The first third factor is identical to the aforementioned transmission power correction step value.

According to an embodiment of the invention, the code division multiple access (CDMA) system is a wideband code division multiple access (WCDMA) system operating in a fast hybrid automatic repeat request (H-ARQ). Particularly, hybrid automatic repeat request (H-ARQ) is a fast physical hybrid automatic repeat request (PHY H-ARQ). The data packets are transmitted to the base station via at least one dedicated physical data channel (DPDCH) and a dedicated physical control channel (DPCCH), wherein the one or more dedicated physical data channels carry the data and further data related information and the dedicated physical control channel accompanying control information. The transmission power factor is applied selectively on the at least one dedicated physical data channel (DPDCH).

According to an embodiment of the invention, a software tool for determining a transmission power factor being operable with an i-th re-transmission is provided. The software tool comprises program portions for carrying out the operations of the aforementioned methods according to embodiments of the invention when the software tool is implemented in a computer program and/or executed.

According to an embodiment of the invention, there is provided a computer program for determining a transmission power factor being operable with an i-th re-transmission. The computer program comprises program code portions for carrying out the operations of the aforementioned methods according to embodiments of the invention when the program is executed on a processing device, a terminal device, a communication terminal device or a network device.

According to an embodiment of the invention, a computer program product is provided which comprises program code portions stored on a computer readable medium for carrying out the aforementioned methods according to embodiments of the invention when the program product is executed on a processing device, a terminal device, a communication terminal device or a network device According to an embodiment of the invention, a mobile terminal device for determining a transmission power being operable with an i-th re-transmission during an uplink data transmission to a base station is provided. Therefore, the mobile terminal device comprises at least a communication interface, a component for determining a first error quantity and a second error quantity, a component for determining an error ratio and a component for determining a transmission power factor.

The communication interface allows for transmitting a sequence of individual data packets over a code division multiple access (CDMA) system supported by an automatic repeat request (ARQ) process, wherein a transmission of one of the sequence of individual data packets either corresponds to a first transmission or an i-th re-transmission. Further, the communication interface allows for receiving a pre-defined number of status information items each containing at least one of an acknowledgement item and a non-acknowledgement item in accordance with the automatic repeat request (ARQ).

The component for determining the first error quantity and the second error quantity is able to derive these both error quantities from the pre-defined number of status information items. The first error quantity is equal to a number of i-th re-transmissions, whereas the second error quantity is equal to a number of i-th re-transmissions each being responded a status information item containing a non-acknowledgement item.

The component for determining the error ratio allows for deriving the error ratio as an i-th error ratio from the first error quantity and the second error quantity and the component for determining a transmission power factor allows for obtaining the transmission power factor from a current valid transmission power factor and a transmission power correction factor being pre-defined such that a difference between the i-th error ratio and a pre-defined target error ratio is minimized.

According to an embodiment of the invention, the mobile terminal device further comprises a component for comparing a deviation or a variation of a difference between the error ratio and a pre-defined target error ratio with a pre-defined deviation level and a component for determining a transmission power correction. The transmission power correction factor is a function of at least a transmission power correction step value, the first error quantity, the second error quantity and the pre-defined target error ratio. According to an embodiment of the invention the component for comparing compares an absolute deviation or an absolute variation of the difference with the pre-defined deviation level.

According to an embodiment of the invention, the component for determining the transmission power correction factor is further able to compare the error ration and the pre-defined target error ratio. In case of the error ratio is greater the transmission power correction factor is determined such that transmission power factor is increased and in case the error ratio is smaller ratio the transmission power factor is decreased.

According to an embodiment of the invention, the component for determining the error ratio is able to calculate a quotient of the second error quantity and the first error quantity, particularly separately for each i-th retransmission resulting in an i-th error ratio.

According to an embodiment of the invention, the component for determining the transmission power correction factor allows for calculating a of a first factor, a second factor and a third factor. The value of the first factor is either equal to +1 or equal to −1. The second factor is represented by following mathematical denotation:

$$\left( \frac{C_{Ni}^{Ki} \cdot FER^{Ki}(1 - FER)^{Ni - Ki}}{FER} \right)^{-1}$$

where $C_{Ni}^{Ki}$ is a binomial coefficient, FER is the pre-defined target error ratio, Ni is the first error quantity and Ki is the second error quantity. Particularly, the binomial coefficient $C_{Ni}^{Ki}$ may be expressed also as $$C_{Ni}^{Ki} = \binom{Ni}{Ki} = \frac{Ni!}{Ki! \cdot (Ni - Ki)!}.$$

The first third factor is identical to the aforementioned transmission power correction step value.

According to an embodiment of the invention, the mobile terminal device is a wideband code division multiple access (WCDMA) capable device operating data communication supported by fast hybrid automatic repeat request (H-ARQ). Particularly, hybrid automatic repeat request (H-ARQ) is a fast physical hybrid automatic repeat request (PHY H-ARQ). The data packets are transmitted to the base station via at least one dedicated physical data channel (DPDCH) and a dedicated physical control channel (DPCCH), wherein the one or more dedicated physical data channels carry the data and further data related information and the dedicated physical control channel accompanying control information. The transmission power factor is applied selectively on the at least one dedicated physical data channel (DPDCH).

According to an embodiment of the invention, a system of a mobile terminal device and a base station is provided. The base station comprises at least a communication interface for receiving a sequence of individual data packets transmitted from the mobile terminal device and for transmitting status information items to the mobile terminal device. The status information items, one for each received data packet, is based on the automatic repeat request (ARQ) and comprises an acknowledgement/non-acknowledgement item as aforementioned. The automatic repeat request (ARQ) is processed by a component or sub-component of the base station.

The mobile terminal device is a mobile terminal device according to an embodiment of the invention described in detail above and comprises the aforementioned components. The back transmission of status information items of the base station being based on a communication interface and a ARQ-operating component is sufficient to operate the method for determining a transmission power factor according to an embodiment of the invention.

BRIEF DESCRIPTION OF THE DRAWINGS

For a fuller understanding of the nature and object of the present invention, reference should be made to the following detailed description taken in conjunction with the following drawings, in which:

FIG. 4a shows a value matrix containing values relating to power adjusting to be employed in the power adjustment algorithm according to an embodiment of the invention;

DETAILED DESCRIPTION

Figure 1:
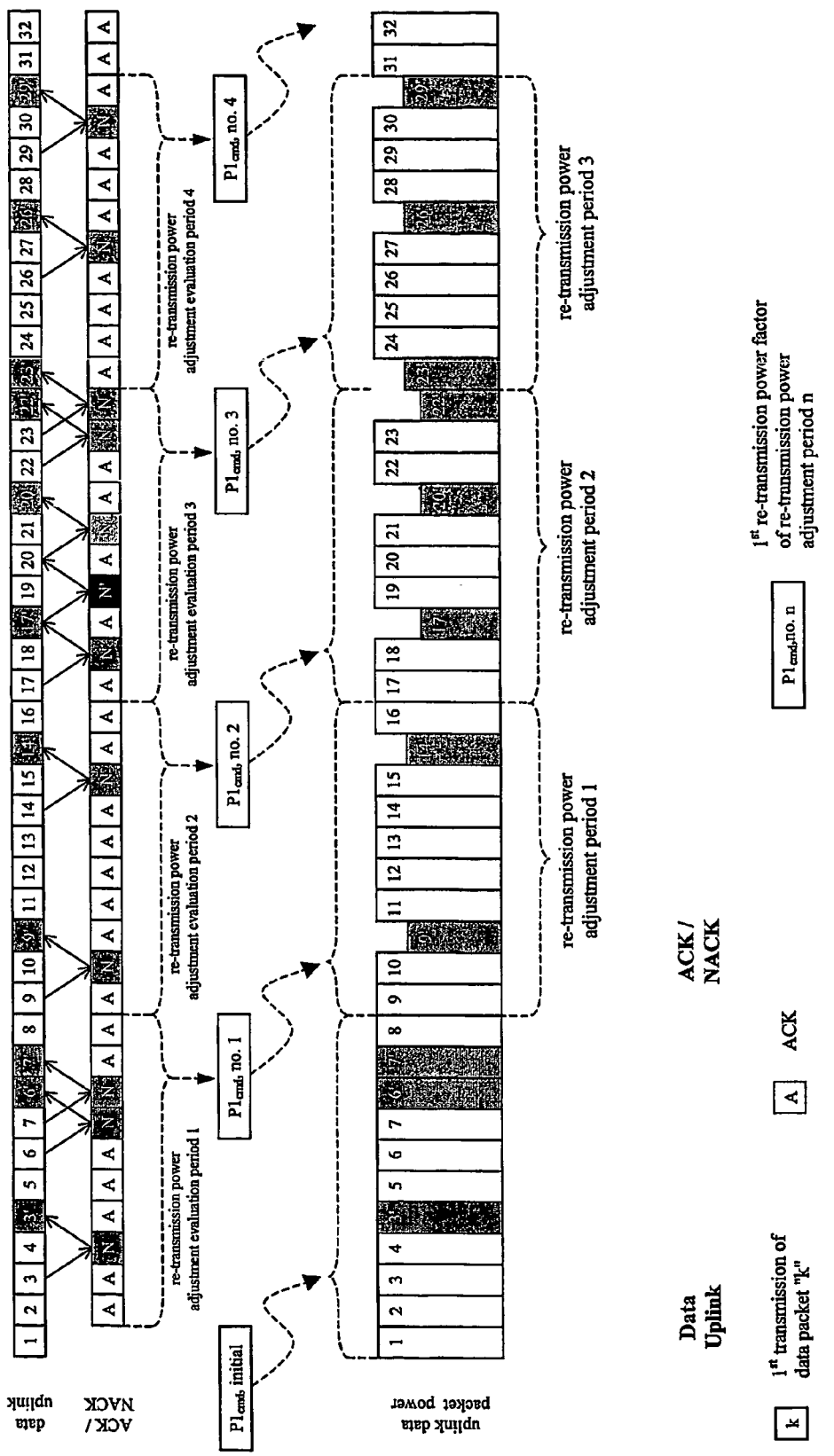
FIG. 1 show a schematic time sketch illustrating uplink transmission and re-transmission of data packets from a terminal device (UE) to a base station (BS) according to an embodiment of the invention.

Same or equal parts, features and/or operations shown in the figures will be referred to using the same reference numerals.

FIG. 1 show a schematic time sketch illustrating uplink transmissions and re-transmissions of data packets from a terminal device (UE) to a base station (BS) according to an embodiment of the invention. The terminal device communicates data to the base station via a code division multiple access system, such as a wideband code division multiple access (WCDMA) system as implemented in a universal mobile communication system (UMTS). The data is segmented in several data packets (corresponding to time Yes) to be transmitted via one or several data uplink channels from the UE to the BS and a H-ARQ method is employed involving a back signaling from the BS to the UE and determining the content of the data packets being re-transmitted. That is, the data packet receiving BS checks each received data packet and transmits back an acknowledgement or a non-acknowledgement signal via an indicating downlink channel to the UE. An acknowledgement signal (ACK) indicates to the UE that the preceding transmitted data packet has been transmitted error-free (successfully) such that the BS was able to decode the data packet. A non-acknowledgement signal (NACK) indicates to the UE that the preceding transmitted data packet has been transmitted erroneously (i.e. not successfully, not decodable) such that the BS requires additional data provided by a re-transmission of a data packet for decoding. The additional data contained in the re-transmission data packet is determined by the H-ARQ method employed and is based on the original transmitted data packet. A combination of transmitted data packet being received erroneous and one or more re-transmitted additional data packets shall finally allow for decoding the original data packet.

Following assumptions are made: The maximum number of re-transmissions is set to 1 and new packets are transmitted even in case this maximum number of re-transmissions is exceeded (herein, even in case the $1^{st}$ re-transmission of a data packet is erroneous). The delay between transmission and a possibly required re-transmission is set to two (time) frames, wherein one data packet is transmitted in one (time) frame. The re-transmission power adjustment period is selected to be a duration of 10 frames i.e. lasts over 10 received acknowledgement or non-acknowledgement signals. Correspondingly, an i-th re-transmission power adjustment command $Pi_{cmd}$ is valid for i-th data packet re-transmissions over 10 frames before it is again determined being based on the preceding re-transmission power adjustment period. That is, the $1^{st}$ re-transmission power adjustment command $P1_{cmd}$ is valid for the $1^{st}$ data packet re-transmissions, the $2^{nd}$ re-transmission power adjustment command $P2_{cmd}$ is valid for the $2^{nd}$ data packet re-transmissions and so on. Herein because of the maximal number of re-transmissions set to 1 only the $1^{st}$ re-transmission power adjustment command $P1_{cmd}$ is illustrated and involved in the time sequence of data packets.

Since no re-transmission power adjustment evaluation period of 10 (time) frames (as assumed and set forth above) is available for deriving a $1^{st}$ re-transmission power adjustment command $P1_{cmd}$ an initial $1^{st}$ re-transmission power adjustment command $P1_{cmd,initial}$, that is, initially the $1^{st}$ re-transmission power adjustment command $P1_{cmd}$ is set valid to $P1_{cmd}=P1_{cmd,initial}$ where for example $P1_{cmd,initial}=0$ dB. This initial power adjustment command $P1_{cmd,initial}$ may be defined by a (pre-defined) system parameter resulting here in the initial setting of the initial $1^{st}$ re-transmission power adjustment command $P1_{cmd,initial}=0$ dB. This (pre-defined) system parameter is a system defined parameter. For example, this system defined parameter may vary depending on known conditions like quality of service (QoS) quantities obtained previously and applicable for estimating this initial $1^{st}$ re-transmission power adjustment command $P1_{cmd,initial}$. The $1^{st}$ re-transmission power adjustment command $P1_{cmd}$ set valid to $P1_{cmd}=0$ dB corresponds to a non reduced transmission power for $1^{st}$ re-transmissions in comparison to the original transmission power for $1^{st}$ data packet transmissions. Alternatively, the $1^{st}$ re-transmission power adjustment command $P1_{cmd}$, may initially have a value resulting in a reduced transmission power for $1^{st}$ re-transmissions, that is, for example $P1_{cmd,initial}=-3$ dB. Analogously, further initial i-th re-transmission power adjustment command $Pi_{cmd,initial}$ (not shown) are defined as (pre-defined) system defined parameters corresponding and being analogously to the description given in detail with reference to the initial $1^{st}$ re-transmission power adjustment command $P1_{cmd,initial}$.

These assumptions are made in order to allow for presenting the depicted example data packet uplink transmission in a clear and understandable manner sufficient to illustrate the inventive concept. The assumptions are not to limit the scope of the invention that is only defined by the accompanying claims.

In the following FIG. 1 will be described in detail in conjunction with the above defined assumptions.

32 individual data packets are depicted as boxes containing a data packet number 1, 2, 3, . . . , 32, wherein white shaded boxes represent $1^{st}$ transmissions of data packets (containing original data) and gray shaded boxes represent $1^{st}$ re-transmissions of data packets due to preceding $1^{st}$ transmissions of data packets received non-decodable by the BS. The boxes representing $1^{st}$ re-transmissions of data packets each contains the original data packet number 3', 6', 7', . . . , 29' to which the $1^{st}$ re-transmission and the corresponding data packet relate, respectively.

The data packets are transmitted in a timely sequence from a UE to a BS via a data uplink channel. An ACK/NACK signaling channel allows the BS for indicating to the UE if the received data packet is decodable or non-decodable. The signaling information on the ACK/NACK signaling channel is illustrates by a sequence of boxes each containing either an A character or a N character, wherein the signaling information is displaced by one (time) frame. An A character contained in a white shaded box represents an acknowledgement signal indicating that the received data packet is decodable by the BS; whereas a N character colluded in a gray shaded box represents a non-acknowledgement signal indicating that the received $1^{st}$ transmission data packet is not decodable by the BS, i.e. is non-decodable being based on the data and information currently available by the BS (at the moment of signaling). A non-acknowledgement signal relating to a $1^{st}$ transmission instructs the UE to $1^{st}$ re-transmit a data packet in accordance with the employed H-ARQ mechanism. Further, a N character contained in a black shaded box represents a non-acknowledgement signal indicating that the received $1^{st}$ transmission data packet in combination with the $1^{st}$ re-transmission data packet being based on the $1^{st}$ transmission data packet is still not decodable by the BS. A non-acknowledgement signal relating to a $1^{st}$ re-transmission instructs the UE to $2^{nd}$ re-transmit data in accordance with the employed H-ARQ mechanism. Since the maximum number of re-transmission is presumed to be limited to one, a new $1^{st}$ transmission is initiated by the UE.

The first 11 data packets (i.e. data packets 1, 2, 3, 4, 3', 5, 6, 7, 6' and 7', 8) are transmitted from the UE to the BS, wherein the data packet 1, 2, 3, 4, 5, 6, 7, and 8 are each $1^{st}$ transmissions of data packets. In accordance with the depicted ACK/NACK signaling information the BS indicates to the UE (displaced by one frame) that the data packets 1, 2, 4, 3', 5, 6' and 7' have been successfully transmitted such that they are decodable. A non-acknowledgement signal associated with data packet 3 causes a 1$^{st}$ re-transmission of a data packet 3' (relating to data packet 3) two frames later such as described and defined above. The same is depicted for the data packets 6 and 7, wherein relating to each of them 1$^{st}$ re-transmissions of data packet 6' and data packet 7' is performed 2 frames later, respectively.

A 1$^{st}$ re-transmission power adjustment command is valid for these first 11 data packets, wherein the 1$^{st}$ re-transmission power adjustment command is especially valid for the 1$^{st}$ re-transmission of data packets i.e. the data packets 3', 6' and 7'. 1$^{st}$ transmissions of data packets are each performed with a transmission power which is determined by the employed communication system. Since no re-transmission power adjustment evaluation period of 10 (time) frames (as assumed and defined and described above) is available for deriving a 1$^{st}$ re-transmission power adjustment command an initial 1$^{st}$ re-transmission power adjustment command P1$_{cmd}$, that is, initially is set valid to P1$_{cmd}$=0 dB. As aforementioned, the 1$^{st}$ re-transmission power adjustment command P1$_{cmd}$, initial instructs to employ the same transmission power as for 1$^{st}$ transmission of data packets (e.g. P1$_{cmd, initial}$=0 dB). The transmission power for the 1$^{st}$ re-transmission is not reduced. This is depicted in an uplink data packet power column diagram. The height of the columns arranged in line with the illustrated data packets reflects a transmission power, the shorter the height the lower the transmission power.

The ACK/NACK signaling information associated to the data packets 1 to 7' is evaluated (re-transmission power adjustment evaluation period 1) and a 1$^{st}$ re-transmission power adjustment command P1$_{cmd}$, no. 1 is derived from this evaluation. Further i-th transmission power adjustment command (Pi$_{cmd}$, no. 1, where i>1) are not depicted since the maximum number of allowed re-transmission is set to 1. The P1$_{cmd}$, no. 1 is valid for the succeeding 10 (time) frames illustrated as re-transmission power adjustment period 1 comprising the data packets 9 to 16. The P1$_{cmd}$, no. 1 instructs to employ a reduced transmission power for the 1$^{st}$ re-transmission (when a 1$^{st}$ re-transmission is indicated to be is necessary). The reduced transmission power is illustrated for the 1$^{st}$ re-transmission of data packet 9' (relating to data packet 9) and the 1$^{st}$ re-transmission of data packet 14' (relating to data packet 14) both being performed with a lower transmission power depicted as shorter power columns (columns 9' and 14'). Each of the 1$^{st}$ re-transmissions of data packet 9' and 14' is caused by a preceding non-acknowledgement signaling information being received by the UE simultaneously with the transmitting of the data packets 10 and 15, respectively.

Still further, the ACK/NACK signaling information of re-transmission power adjustment evaluation period 2 HACK signaling information associated to the data packets 8 to 14') is evaluated and a new 1$^{st}$ re-transmission power adjustment command (P1$_{cmd}$, no. 2) is derived therefrom. The P1$_{cmd}$, no. 2 is valid for the succeeding 10 (time) frames illustrated as re-transmission power adjustment period 2 including the data packets 17 to 22'. The transmission power for the 1$^{st}$ re-transmissions of data packets (P1$_{cmd}$, no. 2) is once again lowered in comparison with P1$_{cmd}$, no. 1 what can be seen for the 1$^{st}$ re-transmission data packets 17', 20' and 22'. Focusing on data packet 17, a first transmission thereof is indicated by the BS to be not decodable such that a 1$^{st}$ re-transmission of data packet 17' relating to data packer 17 with reduced transmission power in accordance with P1$_{cmd}$, no. 2 is instructed by a non-acknowledgement signaling information received during 1$^{st}$ transmission of data packet 18. The 1$^{st}$ re-transmission of data packet 17' is operated 2 frames after its 1$^{st}$ transmission of data packet 17 (as defined above), i.e. directly in that (time) frame after the 1$^{st}$ transmission of the succeeding data packet 18 (relative to data packet 17). A non-acknowledgement signaling information associated with the 1$^{st}$ re-transmission of data packet 17' received during the 1$^{st}$ transmission of data packet 19 indicates to the UE that the combination of received data packet 17 and received data packet 17' (containing information in accordance with the employed H-ARQ method) is sill not decodable by the BS. Since only one re-transmission is allowed (maximal number of re-transmission is set to 1) a new 1$^{st}$ transmission is performed depicted as data packet 20. Once again the 1$^{st}$ transmission of data packet 20 is signalized (during 1$^{st}$ transmission of data packet 21) to be not decodable and in accordance with the above defined assumptions a 1$^{st}$ re-transmission of data packet 20' relating to data packet 20 is performed after the 1$^{st}$ transmission of data packet 21. Further, the both 1$^{st}$ transmissions of data packets 22 and 23 are also signalized to be not decodable such that 1$^{st}$ re-transmissions of data packets 22' and 23' are performed. In the transmission power illustration aligned with the data packet transmission illustration is can be seen that the transmission power of the 1$^{st}$ re-transmission of data packet 22' is commanded by P1$_{cmd}$, no. 2 whereas the transmission power of the 1$^{st}$ re-transmission of data packet 23' is commanded by P1$_{cmd}$, no. 3 since the 1$^{st}$ re-transmission of data packet 23' is operated in the re-transmission power adjustment period 3. Hence, the transmission power of the 1$^{st}$ re-transmission data packet 22' and of data packet 23' may differ and herein they differ.

Analogously, the ACK/NACK signaling information of re-transmission power adjustment evaluation period 3 (NACK signaling information associated to the data packets 16 to 23) is evaluated and a new 1$^{st}$ re-transmission power adjustment command P1$_{cmd}$, no. 3 is derived therefrom. The P1$_{cmd}$, no. 3 is valid for the succeeding 10 (time) frames illustrated as re-transmission power adjustment period 3 including the data packets 23' to 29'. The transmission power P1$_{cmd}$, no. 3 for the 1$^{st}$ re-transmissions of data packets is increased in comparison with P1$_{cmd}$, no. 2 what can be seen for the 1$^{st}$ re-transmission of data packets 23', 26' and 29'. As aforementioned, the 1$^{st}$ re-transmission of data packet 23' is performed under validity of P1$_{cmd}$, no. 3 in the re-transmission power adjustment period 3. The 1$^{st}$ transmission of data packet 26 and 29 in this re-transmission power adjustment period 3 are also signalized to be corrupted such that corresponding 1$^{st}$ re-transmission of data packets 26' and 29' are performed each 2 (time) frames after the respective 1$^{st}$ transmission.

Further analogously, the ACK/NACK signaling information of re-transmission power adjustment evaluation period 4 (NACK signaling information associated to the data packets 22' to 30) is evaluated and a new 1$^{st}$ re-transmission power adjustment command P1$_{cmd}$, no. 4 is derived therefrom. The P1$_{cmd}$, no. 4 is valid for the succeeding 10 (time) frames beginning the 1$^{st}$ transmission of data packet 31.

The above described H-ARQ method comprising an acknowledgement/non-acknowledgement signaling which instructs a transmitter to re-transmit information corresponding to a data transmission of which data is not decodable, and operating directly on physical transmission channels is denoted as physical hybrid automatic repeat request. The re-transmitted information in case of a non-acknowledgement signalizing depends on the type and kind of the employed H-ARQ method. In case of a combining H-ARQ method all received data corresponding to a certain data packet (i.e. the 1$^{st}$ transmitted data packet (corrupted, erroneous), the 1$^{st}$ re-transmitted data packet (correcting information) and eventually further 2$^{nd}$, 3$^{rd}$ . . . re-transmitted data packets) has to be stored until data is decodable from the total received original corrupted data and correcting information data. Consequently, the maximal number of allowed re-transmission depends on the data storage capacity of the receiver or has to be fitted to the capacity of the receiver, respectively.

Conventionally, such a fast PHY H-ARQ is implemented in a low open systems interconnection (OSI) layer, for example OSI layer 1, OSI layer 2 or an interposed layer arranged between OSI layer 1 and OSI layer 2. The Implementation in other OSI layers is problematic or even impossible because of latency time caused by the processing operation associated to the OSI layers.

Figure 2:
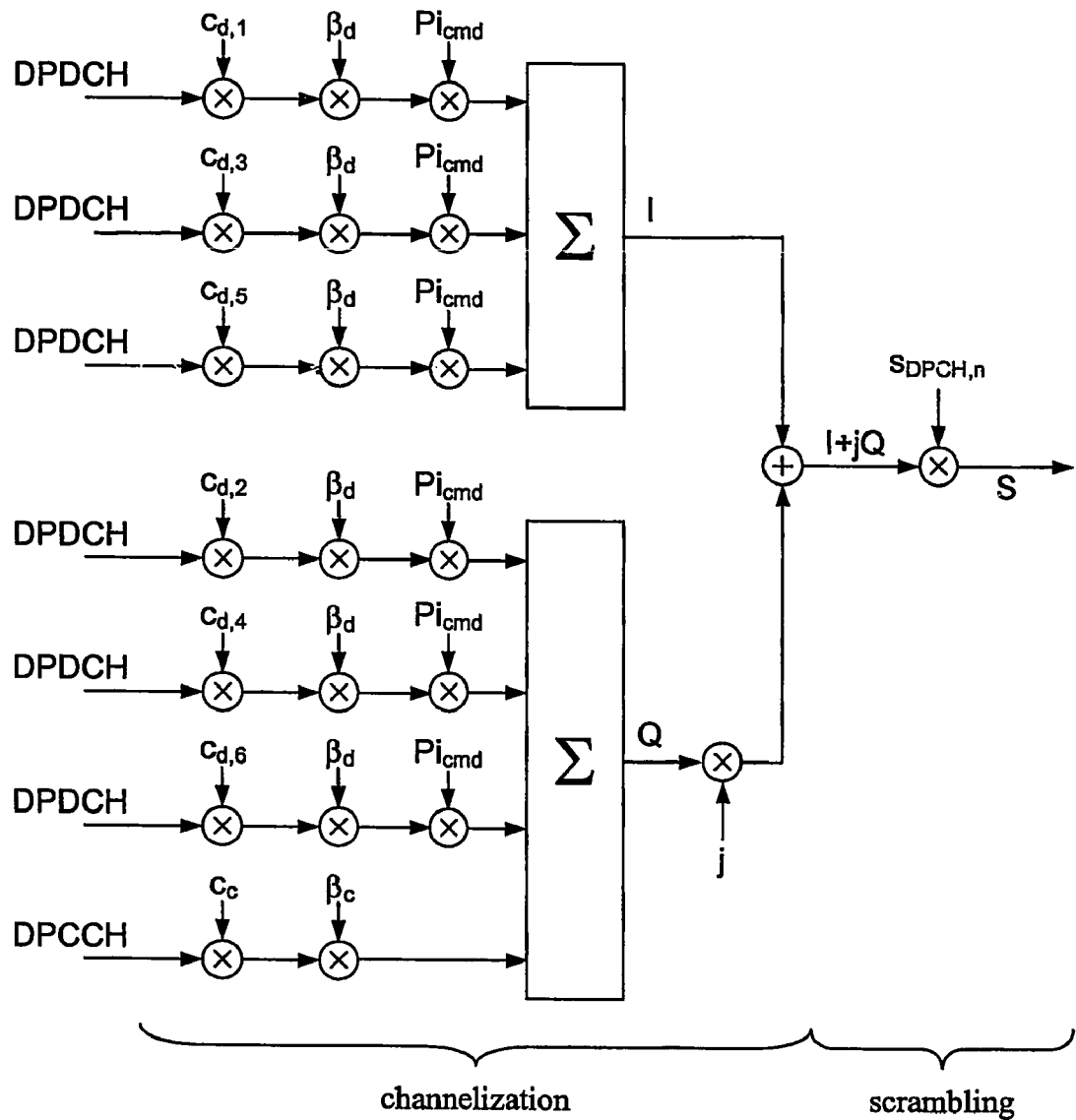
FIG. 2 shows a block diagram illustrating schematically channelization, complex combining and spreading of a couple of dedicated physical data channels and an associated dedicated physical control channel according to an embodiment of the invention.

FIG. 2 shows a block diagram illustrating schematically channelization, complex combining (I/Q combining) and spreading of a couple of dedicated physical data channels and an associated dedicated physical control channel according to an embodiment of the invention. In FIG. 1 an example sequence of an uplink data packet transmission from a UE to a BS employing the inventive concept for adjusting re-transmission power has been presented.

In code division multiple access (CDMA) systems and particular in wideband code division multiple access (WCDMA) systems spreading code technology is employed for separating multiple simultaneous transmissions caused from multiple transmitters including a plurality of mobile terminals (UEs) and a single base station (BS). Moreover, it is not only necessary to be able to separate the transmissions of a UE or a single BS from other transmitting entities but it is also necessary to separate various simultaneous transmissions that a single entity (UE or BS) may have generated. That is, in case of a UE transmitting both data information and control information to a BS, first the BS must be capable to separate the transmission from this UE from other ones and second the BS must be capable to separate both data information and control information from this UE. A two-step approach comprising a channelization and scrambling step allows to support this aforementioned requirement and will be described with reference to FIG. 2 focusing to the situation that a UE transmits data to a BS (uplink transmission).

In FIG. 2 an arrangement of six different physical data channels (dedicated physical data channels: $DPDCH_1, \ldots, DPDCH_6$) and a physical control channel (dedicated physical control channel: DPCCH) used for data uplink transmission is depicted. The physical data channels carry user data whereas the physical control channel carries control information. A typical WCDMA-enabled UE is allowed to employ minimal one physical data channel DPDCH in combination with one physical control channel DPCCH and maximal six physical data channels $DPDCH_1, \ldots, DPDCH_6$ in combination with one physical control channel DPCCH for data uplink transmission to a BS.

In a first operation a set of channelization codes $C_{d,1}, C_{d,2}, C_{d,3}, C_{d,4}, C_{d,5}, C_{d,6}$ and a channelization codes $C_c$ are applied to the physical data channels and the physical control channel, respectively. The channelization codes $C_{d,1}, \ldots, C_{d,6}$ are variable spreading factors, i.e. spreading factors of e.g. 4, 8, 16, 32, 64, 128 and 256 resulting in a corresponding variable bit rate for the physical data channels (at a chip rate of 3.84 Mcps from 15 Kbps gross with spreading factor length 256 up to 960 Kbps gross with spreading factor length 4). Conventionally the orthogonal variable spreading factor (OVSF) codes are used as channelization codes which are recursively defined. The physical control channel is typically spread with a fixed spreading factor of 256. The channelization of physical channels using variable and fixed spreading factors is employed to spread the physical data channels of variable bit rate and the physical control channel of fixed bit rate to the chip rate of the system. The channelization allows a receiver (BS) for separating unambiguously the individual the physical data channels and the physical control channel.

In a next operation a gain factors $\beta_d$ is applied to each physical data channels and a gain factors $\beta_c$ is applied to the physical control channel resulting in weighting of the physical data channels and the physical control channel. Conventionally, the two gain factors are coded as a 4-bit word representing steps from zero and one, wherein one of the gain factors is set to one.

In a following operation, a re-transmission adjustment power factor $Pi_{cmd}$ is applied to the physical data channels. The re-transmission adjustment power factor $Pi_{cmd}$ corresponds to the aforementioned re-transmission adjustment power command $Pi_{cmd}$. The re-transmission power adjustment power factor $Pi_{cmd}$ is applicable in case the physical data channels carry information in accordance with a re-transmission data packet.

In a following operation, the physical data channels $DPDCH_1$, $DPDCH_3$ and $DPDCH_5$ are combined to a spread signal on the so-called I-branch (in-phase branch). The physical data channels $DPDCH_2$, $DPDCH_4$ and $DPDCH_6$ and the physical control channel DPCCH are combined to a spread signal on the so-called Q-branch (quadrature branch). The combined signal on the I-branch is mathematically treated as stream of real signals (bits) whereas the combined signal on the Q-branch is mathematically treated as stream of imaginary signals (bits). The stream of real signals (bits) and stream of imaginary signals (bits) are combined to a complex signal (denoted as I+j·Q) at the chip rate of the system.

In a following operation, the resulting stream of complex signals (bits) is subjected to a complex-valued scrambling code $s_{DPCH,n}$ which is aligned with the beginning of a transmission (time) frame. The scrambling code serves $s_{DPCH,n}$ to allow a receiver (BS) for separating unambiguously transmission from other transmitters (UEs) employing different scrambling codes for their transmissions. In a final operation, the spread and scrambled stream of complex signals forms a complex-valued input stream for a quadrature phase shift keying (QPSK) modulator (not shown in FIG. 2).

The re-transmission power adjustment power factor $Pi_{cmd}$ is only applied to the physical data channels $DPDCH_1, \ldots DPDCH_6$ and explicitly not to the physical control channel DPCCH such that the physical control channel DPCCH is power constantly for re-transmissions. Due to the constant powering of the physical control channel DPCCH the aforementioned fast power control at the BS is not affected from the variable powering of the physical data channels $DPDCH_1, \ldots DPDCH_6$ during re-transmissions and therefore the channel estimation of the BS required for power control is not interfered by the presented adaptive re-transmission power adjustment.

Figure 3:
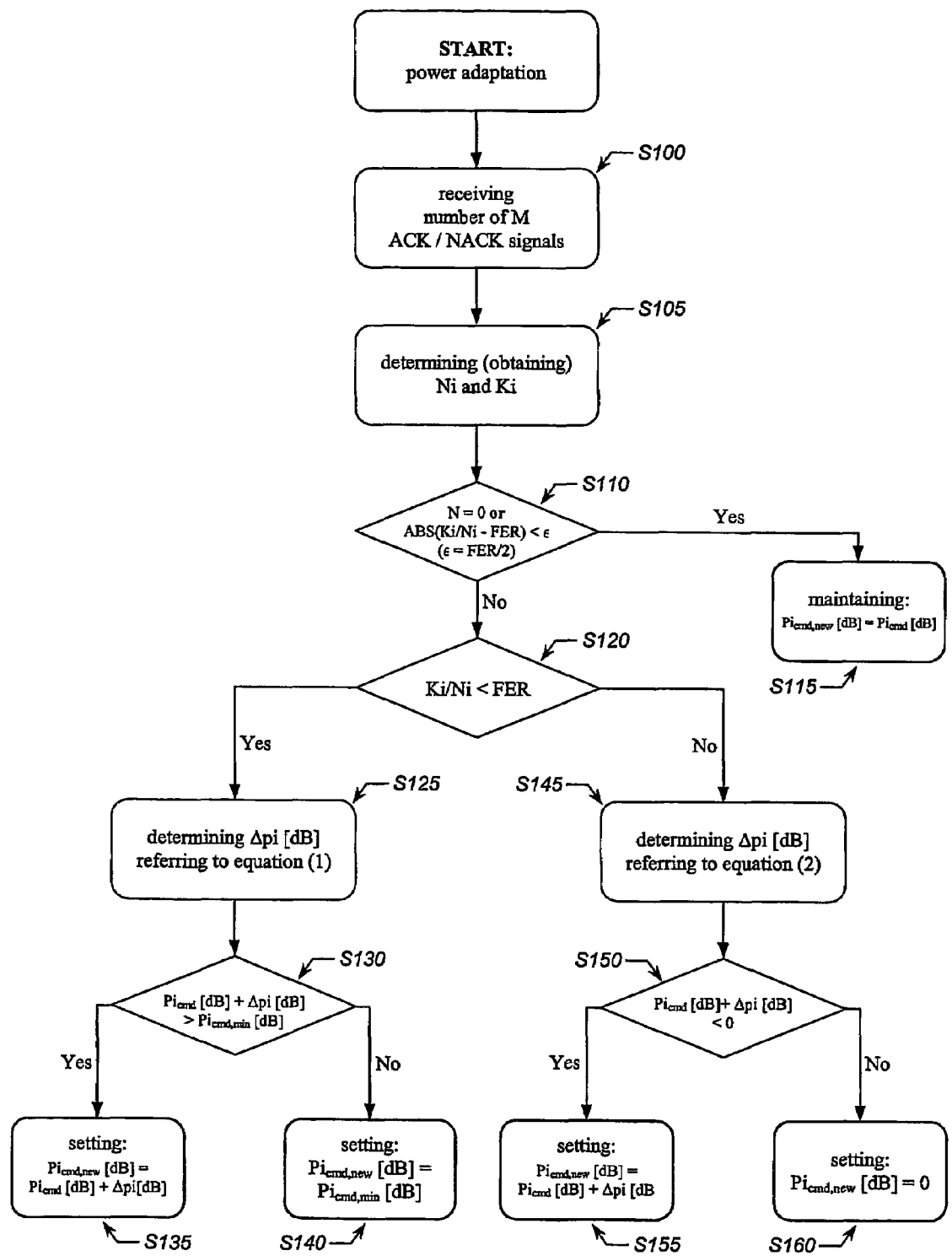
FIG. 3 shows an operational sequence illustrating a possible implementation of the power adjustment algorithm according to an embodiment of the invention.

FIG. 3 shows an operational sequence illustrating a possible implementation of the power adjustment algorithm according to an embodiment of the invention. In FIG. 1 an example sequence of a data uplink transmission from a UE to a BS employing the inventive concept for adjusting re-transmission power has been presented. in FIG. 2 an example implementation for adjusting the transmission power for re-transmissions has been described. The following block diagram illustrates a method for determining a re-transmission adjustment power factor or a corresponding re-transmission adjustment power command $Pi_{cmd}$ will be described in detail, respectively.

The method for determining re-transmission adjustment power command $Pi_{cmd}$ is performed as a background process independently from other methods, processes and procedures performed and/or operated on the mobile terminal (UE).

The following method according to an embodiment of the invention describes an implementation of an algorithm for determining an i-th re-transmission adjustment power command $Pi_{cmd}$ affecting the transmission power of an i-th re-transmission in the way of an i-th re-transmission adjustment power factor $Pi_{cmd}$ [dB] representing a decibel value defining a reduction factor. An i-th re-transmission adjustment power factor $Pi_{cmd}$ [dB]=0 means that the transmission power for transmitting an i-th re-transmission data packet is equal to the transmission power for transmitting a $1^{st}$ transmission data packet. An i-th re-transmission adjustment power factor $Pi_{cmd}$ [dB]=$Pi_{cmd,min}$ [dB] (where $Pi_{cmd,min}$ [dB]>0) means that the transmission power of an i-th re-transmission data packet is reduced by the factor $Pi_{cmd,min}$ [dB] in comparison to the transmission power of a $1^{st}$ transmission data packet. The i-th re-transmission adjustment power factor $Pi_{cmd,min}$ [dB] is the minimal allowed i-th re-transmission adjustment power factor $Pi_{cmd,min}$ [dB] and the i-th re-transmission adjustment power factor $Pi_{cmd}$ [dB] varies in the range between $Pi_{cmd}$ [dB]=0 and $Pi_{cmd}$ [dB]=$Pi_{cmd,min}$ [dB], wherein an i-th transmission power correction step value $\Delta Pi_{step}$ [dB] defines the maximum relative width of steps with which the i-th re-transmission adjustment power factors $Pi_{cmd}$ [dB] are varied. The i-th transmission power correction step value $\Delta Pi_{step}$ [dB] is pre-defined.

In an operation S100, the UE has received a number of M acknowledgement and non-acknowledgement signaling information as a result of M preceding transmissions and i-th re-transmissions. The number M corresponds to the number of frames comprised in a re-transmission power adjustment evaluation period as described above with reference to FIG. 1. The value of M has to be sufficiently larger than delay between a transmission and a possible re-transmission.

In an operation S105, the M received acknowledgement and non-acknowledgement signaling information are evaluated. A first quantity Ni is derived from the acknowledgement and non-acknowledgement signaling information. The first quantity Ni represents the number of i-th re-transmissions occurred in the M evaluated frames. That is, the quantity N1 represents the number of $1^{st}$ re-transmission, the quantity N2 represents the number of $2^{nd}$ re-transmission and so on.

A second quantity Ki is derived from the acknowledgement and non-acknowledgement signaling information. The second quantity Ki represents the number of i-th re-transmission being responded by a non-acknowledgement signaling information which signalizes that the receiver (or BS, respectively) was not able to decode. That is, the quantity K1 represents the number of $1^{st}$ re-transmission being received by a receiver (or BS, respectively) but which are responded by a non-acknowledgement signaling information from the receiver (or BS, respectively) which signalizes that a decoding of the data currently available by the BS (or BS, respectively) is still not possible, the quantity K2 represents the number of $2^{nd}$ re-transmission being transmitted in sequence to a non-acknowledgement signaling information associated with a $1^{st}$ re-transmission but which are responded by a non-acknowledgement signaling information from the receiver (or BS, respectively) which signalizes that a decoding of the data currently available by the BS (or BS, respectively) is still not possible and so on.

In an operation S110, an i-th error ratio is determined from the first quantity Ki and the second quantity Ni, i.e. an i-th error ratio of the number of i-th re-transmissions resulting in non-decodable data at the receiver (or BS, respectively) to the number of i-th re-transmissions resulting in decodable and non-decodable data at the receiver (or BS, respectively) is determined. An i-th absolute deviation of this i-th error ratio regarding a pre-defined target fame error rate (target FER) are determined, i.e. an i-th absolute variation between i-th error ratio and pre-defined target frame error ratio. An i-th absolute deviation is either above a pre-defined deviation level or below this pre-defined deviation level. The pre-defined deviation level is a pre-defined system parameter $\epsilon$ which is set forth by the system (the UE, the BS or UE in conjunction with the BS) depending on the conditions, like channel conditions, required quality of service, priorities of the data communication or priorities of the application(s) to which the data communication may be attributed back etc The pre-defined system parameter $\epsilon$ shall be understood as a system defined parameter $\epsilon$. The pre-defined deviation level $\epsilon$ may be derived from the target FER. The wording "target" shall indicate that an optimal value is to be approach by a corresponding floating value. Herein, the i-th error ratio shall be as close as possible to the target FER.

Following mathematical equation represents such a comparison of an i-th absolute deviation and a pre-defined deviation level:

$$ABS(Ki/Ni-FER) < \epsilon (e.g.: \epsilon=FER/2)$$

wherein ABS(Ki/Ni−FER) is the i-th absolute deviation calculated from the i-th error ratio Ki/Ni and the pre-defined target FER and $\epsilon$ is the pre-defined deviation level being a pre-defined system parameter. Particularly, the pre-defined deviation level $\epsilon$ is proportional to the pre-defined target FER, here especially $\epsilon=\frac{1}{2} \cdot FER$, i.e. equal to the half of pre-defined target FER.

In case an i-th absolute deviation exceeds the pre-defined deviation level, i.e. the above presented inequality is false, the i-th re-transmission adjustment power factor $Pi_{cmd}$ [dB] is determined at new and the operational sequence is continued with operation S120. In case an i-th absolute deviation is lower than the pre-defined deviation level, i.e. the above presented inequality is true, the currently valid i-th re-transmission adjustment power factor $Pi_{cmd}$ [dB] is maintained and the operational sequence is continued with operation S115.

In case the first quantity Ni is equal to zero, the i-th error rate can not be calculated in the above presented way such that the i-th absolute deviation is also not defined. Therefore, the first quantity Ni is check separately and in case first quantity Ni is equal to zero the i-th re-transmission adjustment power factor $Pi_{cmd}$ [dB] is analogously maintained and the operational sequence is continued with operation S115.

The pre-defined target FER is pre-determined by the system involving the UE and the BS in order both satisfy a required data throughput rate, a required quality of service and a total system capacity. The required data throughput rate, a required quality of service are primarily determined by one or more applications which generated the data to be transmitted or which receive the transmitted data for further processing.

In an operation S115, the currently valid i-th re-transmission adjustment power factor $Pi_{cmd}$ [dB] is maintained. That is, a new re-transmission adjustment power factor $Pi_{cmd,new}$ [dB] is set equal to the currently valid re-transmission adjustment power factor $Pi_{cmd}$ [dB]. This new i-th re-transmission adjustment power factor $Pi_{cmd,new}$ [dB] is valid during the succeeding re-transmission power adjustment period and the herein presented method is repeated at the end of this succeeding re-transmission power adjustment period to determine a new one.

In an operation S120, an i-th absolute deviation has exceeded the pre-defined deviation level and the direction of exceeding is determined. That is, it is determined whether the i-th error ratio exceeds the target FER relative to which the i-th absolute deviation has been determined or not. Therefore, the i-th error ratio is compared with the target FER which can be denoted mathematically as following:

$$Ki/Ni < FER$$

In case of the i-th error ratio is lower than the target FER the associated i-th re-transmission adjustment power factor $Pi_{cmd}$ [dB] is to be increased in order to approach the target FER. In case of the i-th error ratio is higher than the target FER the associated i-th re-transmission adjustment power factor $Pi_{cmd}$ [dB] is to be decreased in order to approach the target FER. That is, in case the above denoted equation is true the operational sequence is continued with operation S125 and in case the above denoted equation is false the operational sequence is continued with operation S145.

In an operation S125, an i-th re-transmission adjustment power correction value $\Delta Pi_{cmd}$ [dB] is derived from the quantity Ni, the quality Ki, the target FER and a system parameter $C_{Ni}^{Ki}$ weighted with the pre-defined transmission power correction step value $\Delta Pi_{step}$ [dB]. The calculation of the i-th re-transmission adjustment power correction value $\Delta Pi$ [dB] can be denoted mathematically by following equation (1):

$$\Delta Pi[dB] = (-1) \cdot \left( \frac{C_{Ni}^{Ki} \cdot FER^{Ki}(1 - FER)^{Ni-Ki}}{FER} \right)^{-1} \cdot \Delta Pi_{step}[dB] \quad \text{(Eq. 1)}$$

The first-factor (−1) ensures that the i-th re-transmission adjustment power factor $Pi_{cmd}$ [dB] to which the i-th re-transmission adjustment power correction value $\Delta Pi$ [dB] is to be added will be decreased in order to increase the transmission power of an i-th re-transmission. A second factor depends on the quantity Ni, the quality Ki, the target FER and the $C_{Ni}^{Ki}$ is a binomial coefficient. The binomial coefficient may be alternatively mathematically denoted as $$C_{Ni}^{Ki} = \binom{Ni}{Ki} = \frac{Ni!}{Ki! \cdot (Ni - Ki)!}.$$

In a following operation S130 a limit check of a new i-th re-transmission adjustment power factor $Pi_{cmd,new}$ [dB] is performed. The i-th re-transmission adjustment power factor $Pi_{cmd,new}$ [dB] results from a summation of the current i-th re-transmission adjustment power factor $Pi_{cmd}$ [dB] and the i-th re-transmission adjustment power correction value $\Delta Pi$ [dB] in accordance with equation (1). The i-th re-transmission adjustment power factor $Pi_{cmd,new}$ [dB] is not allowed to fall below the pre-defined minimal allowed re-transmission adjustment power factor $Pi_{cmd,min}$ [dB]. The check is mathematically denoted as following:

$$Pi_{cmd}[dB] + \Delta Pi[dB] > Pi_{cmd,min}[dB]$$

In case the value of the i-th re-transmission adjustment power factor $Pi_{cmd,new}$ [dB] is above the level of pre-defined minimal allowed re-transmission adjustment power factor $Pi_{cmd,min}$ [dB] (i.e. the above presented comparison is true) the operational sequence is continued with operation S135. In case the value of the i-th re-transmission adjustment power factor $Pi_{cmd,new}$ [dB] is below the level of pre-defined minimal allowed re-transmission adjustment power factor $Pi_{cmd,min}$ [dB] (i.e. the above presented comparison is false) the operational sequence is continued with operation S140.

In an operation S135, the new i-th re-transmission adjustment power factor $Pi_{cmd,new}$ [dB] is equal to the summation of the current i-th re-transmission adjustment power factor $Pi_{cmd}$ [dB] and the i-th re-transmission adjustment power correction value $\Delta Pi$ [dB] in accordance with equation (1). The summation can be denoted mathematically as following:

$$Pi_{cmd,new}[dB] = Pi_{cmd}[dB] + \Delta Pi[dB]$$

This new i-th re-transmission adjustment power factor $Pi_{cmd,new}$ [dB] is valid during the succeeding re-transmission power adjustment period and the herein presented method is repeated at the end of this succeeding re-transmission power adjustment period to determine a new one.

In an operation S140, the new i-th re-transmission adjustment power factor $Pi_{cmd,new}$ [dB] is set equal to the minimal allowed re-transmission adjustment power factor $Pi_{cmd,min}$ [dB]. This new i-th re-transmission adjustment power factor $Pi_{cmd,new}$ [dB] is valid during the succeeding re-transmission power adjustment period and the herein presented method is repeated at the end of this succeeding re-transmission power adjustment period to determine a new one.

In an operation S145, an i-th re-transmission adjustment power correction value $\Delta Pi_{cmd}$ [dB] is derived from the quantity Ni, the quality Ki, the target FER and a system parameter $C_{Ni}^{Ki}$ weighted with the pre-defined transmission power correction step value $\Delta Pi_{step}$ [dB]. The calculation of the i-th re-transmission adjustment power correction value $\Delta Pi_{cmd}$ [dB] can be denoted mathematically by following equation (2):

$$\Delta Pi[dB] = (+1) \cdot \left( \frac{C_{Ni}^{Ki} \cdot FER^{Ki}(1 - FER)^{Ni-Ki}}{FER} \right)^{-1} \cdot \Delta Pi_{step}[dB] \quad \text{(Eq. 2)}$$

The first factor (+1) ensures that the i-th re-transmission adjustment power factor $Pi_{cmd}$ [dB] to which the i-th re-transmission adjustment power correction value $\Delta Pi$ [dB] is to be added will be increased in order to decrease the transmission power of an i-th re-transmission. A second factor depends on the quantity Ni, the quality Ki, the target FER and the $C_{Ni}^{Ki}$ is a binomial coefficient. The binomial coefficient may be alternatively mathematically denoted as $$C_{Ni}^{Ki} = \binom{Ni}{Ki} = \frac{Ni!}{Ki! \cdot (Ni - Ki)!}.$$

The second factor is analog to the second factor of equation (1).

In a following operation S150 a limit check of a new i-th re-transmission adjustment power factor $Pi_{cmd,new}$ [dB] is performed. The i-th re-transmission adjustment power factor $Pi_{cmd,new}$ [dB] results from a summation of the current i-th re-transmission adjustment power factor $Pi_{cmd}$ [dB] and the i-th re-transmission adjustment power correction value $\Delta Pi$ [dB] in accordance with equation (2). The i-th re-transmission adjustment power factor $Pi_{cmd,new}$ [dB] is not allowed to exceed a value of 0 dB, i.e. the transmission power of an i-th re-transmission is not allowed to exceed the transmission power of $1^{st}$ transmissions.

$$Pi_{cmd}[dB] + \Delta Pi[dB] < 0$$

In case the value of the i-th re-transmission adjustment power factor $Pi_{cmd,new}$ [dB] is below 0 dB (i.e. the above presented comparison is true) the operational sequence is continued with operation S155. In case the value of the i-th re-transmission adjustment power factor $Pi_{cmd,new}$ [dB] is above 0 dB (i.e. the above presented comparison is false) the operational sequence is continued with operation S160.

In an operation S155, the new i-th re-transmission adjustment power factor $Pi_{cmd,new}$ [dB] is equal to the summation of the current i-th re-transmission adjustment power factor $Pi_{cmd}$ [dB] and the i-th re-transmission adjustment power correction value $\Delta Pi$ [dB] in accordance with equation (1). The summation can be denoted mathematically as following:

$$Pi_{cmd,new}[dB]=Pi_{cmd}[dB]+\Delta Pi[dB]$$

This new i-th re-transmission adjustment power factor $Pi_{cmd,new}$ [dB] is valid during the succeeding re-transmission power adjustment period and the herein presented method is repeated at the end of this succeeding re-transmission power adjustment period to determine a new one.

In an operation S160, the new i-th re-transmission adjustment power factor $Pi_{cmd,new}$ [dB] is set equal to 0 dB. This new i-th re-transmission adjustment power factor $Pi_{cmd,new}$ [dB] is valid during the succeeding re-transmission power adjustment period and the herein presented method is repeated at the end of this succeeding re-transmission power adjustment period to determine a new one.

As mentioned above the presented equation (1) and equation (2) include the same second factor. In order to minimize the processing capacity required to determine the second factor a matrix or table can be defined containing at least the values of the second factor for possible quantities Ki and Ni in dependence on a certain target FER and $C_{Ni}^{Ki}$ is the binomial coefficient (compare with the mathematical definition above). Analogously, the matrix or table can also be defined containing the absolute values of the i-th re-transmission adjustment power correction value $\Delta Pi$ [dB] being the product of the second factor and the i-th transmission power correction step value $\Delta Pi_{step}$ [dB].

FIG. 4a shows a value matrix containing absolute values of an i-th re-transmission adjustment power correction value to be employed in the power adjustment algorithm according to an embodiment of the invention.

The absolute values of the i-th re-transmission adjustment power correction value $|\Delta Pi [dB]|$ can be denoted mathematically as following:

$$|\Delta Pi[dB]| = \frac{C_{Ni}^{Ki} \cdot FER^{Ki}(1 - FER)^{Ni-Ki}}{FER} \cdot \Delta Pi_{step}[dB]$$

Under consideration of the assumptions described with reference to FIG. 1, especially a maximum number of one re-transmissions the matrix is a (½M, ½M) matrix since the value of first quantity Ni is smaller than or equal to the half number of the frames comprised in the re-transmission power adjustment evaluation period for the i-th re-transmission adjustment power factor $Pi_{cmd}$ [dB]. The second quantity Ki is always smaller than or equal to the first quantity Ni due to the definition of both quantities. That is, the matrix has a triangular shape.

The required absolute values of the i-th re-transmission adjustment power correction value $\Delta Pi$ [dB] can be simply retrieved (read out) from the matrix which saves processing capacity of the UE. The presented example matrix such is defined that each column contains absolute values of the i-th re-transmission adjustment power correction value $\Delta Pi$ [dB] relating to a certain first quantity Ni and each row contains absolute values of the i-th re-transmission adjustment power correction value $\Delta Pi$ [dB] relating to a certain second quantity Ki.

Figure 4B:
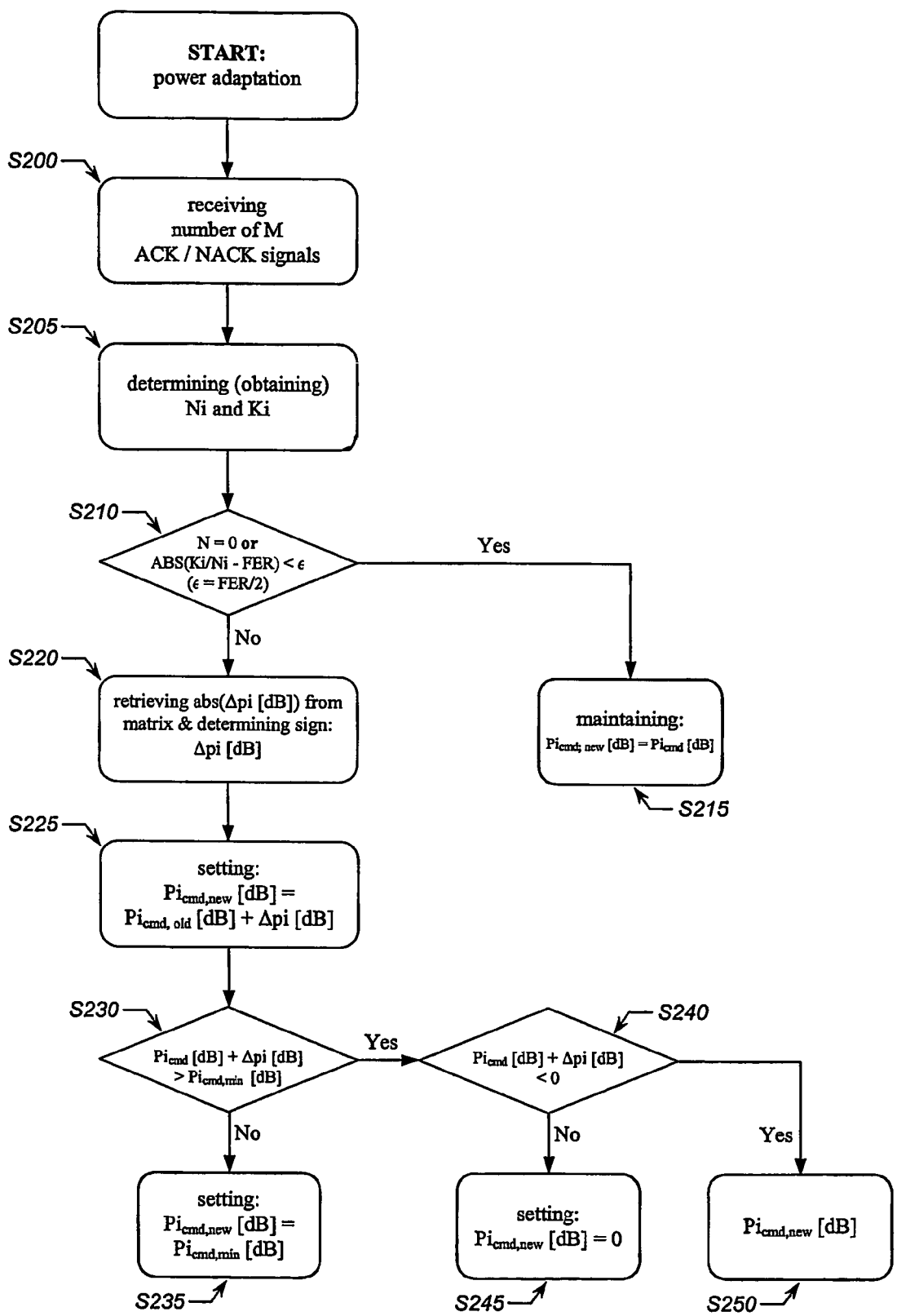
FIG. 4b shows an operational sequence illustrating a further possible implementation of the power adjustment algorithm being based on a power adjustment value matrix as shown in FIG. 4a according to an embodiment of the invention.

The employment of such a value matrix or table will be described in the following with reference to FIG. 4b. FIG. 4b shows an operation sequence illustrating a further possible implementation of the power adjustment algorithm being based on a value matrix as shown in FIG. 4a according to an embodiment of the invention. The herein presented operational sequence is an alternative operational sequence to that presented with reference to FIG. 3. Hence, the definitions provided in the description with reference to FIG. 3 shall be also valid for this alternative operational sequence.

In an operation S200, the UE has received a number of M acknowledgement and non-acknowledgement signaling information as a result of M preceding transmissions and i-th re-transmissions.

In an operation S205, the M received acknowledgement and non-acknowledgement signaling information are evaluated and a first quantity Ni and a second quantity Ki are derived from the acknowledgement and non-acknowledgement signaling information.

In an operation S210, the i-th absolute deviation ABS(Ki/Ni−FER) being calculated from the i-th error rate Ki/Ni and the target FER is compared with a pre-defined deviation level $\epsilon$. Here, the pre-defined deviation level $\epsilon$ is proportional to the pre-defined target FER and especially $\epsilon=\frac{1}{2}\cdot$FER, i.e. equal to the half of pre-defined target FER.

In case the i-th absolute deviation is lower than the pre-defined deviation level $\epsilon=\frac{1}{2}\cdot$FER the current valid i-th re-transmission adjustment power factor $Pi_{cmd}$ [dB] is maintained as new i-th re-transmission adjustment power factor $Pi_{cmd,new}$ [dB]. Correspondingly, the operational sequence is continued with operation S215. In case the i-th absolute deviation exceeds the pre-defined deviation level the operational sequence is continued with S220.

Since the i-th error rate is not defined for first quantity Ni=0, a separate check is performed on Ni. In case the first quantity Ni is equal to zero, the current valid i-th re-transmission adjustment power factor $Pi_{cmd}$ [dB] is analogously maintained as new i-th re-transmission adjustment power factor $Pi_{cmd,new}$ [dB] and correspondingly, the operational sequence is continued with operation S215.

In an operation S220, an absolute value of the i-th re-transmission adjustment power correction value $^{\Delta Pi}$ [dB] is retrieved from the pre-calculated matrix in accordance with the first quantity Ni and the second quantity Ki. The calculation of this matrix is based on the pre-defined target FER, $C_{Ni}^{Ki}$ is the binomial coefficient (compare with the mathematical definition above) and an i-th transmission power correction step value $\Delta Pi_{step}$ [dB]. Each column of the matrix contains absolute values of the i-th re-transmission adjustment power correction value $^{\Delta Pi}$ [dB] corresponding to a certain first quantity Ni and each row of the matrix contains absolute values of the i-th re-transmission adjustment power correction value $^{\Delta Pi}$ [dB] corresponding to a certain second quantity Ki. That is, the absolute i-th re-transmission adjustment power correction value $|^{\Delta Pi}$ [dB]| is defined as a function of the first quantity Ni and the second quantity:

$$|\Delta Pi[dB]| = |\Delta Pi(Ni, Ki)[dB]| \left( \frac{C_{Ni}^{Ki} \cdot FER^{Ki}(1 - FER)^{Ni-Ki}}{FER} \right)^{-1} \cdot \Delta Pi_{step}[dB]$$

The sign or the first factor of the retrieved i-th absolute re-transmission adjustment power correction value $|\Delta Pi [dB]|$ is further determined, respectively to calculate an i-th re-transmission adjustment power correction value $\Delta Pi$ [dB]. The sign is a negative sign (first factor −1) in case the i-th error ratio is smaller than the target PER, otherwise in case the i-th error ratio is higher than or equal to the target FER the sign is a positive sign (first factor +1).

$$\Delta Pi\ [dB] = (\pm 1) \cdot |\Delta Pi(Ni, Ki)[dB]|$$

In an operation S225 a new i-th re-transmission adjustment power factor $Pi_{cmd,new}$ [dB] is calculated being the sum of the current valid i-th re-transmission adjustment power factor $Pi_{cmd}$ [dB] and the i-th re-transmission adjustment power correction value $\Delta Pi$ [dB].

$$Pi_{cmd,new}[dB] = Pi_{cmd}[dB] + \Delta Pi[dB]$$

In an operation S230, an upper limit of the new i-th re-transmission adjustment power factor $Pi_{cmd,new}$ [dB] is checked. In case a minimal allowed i-th re-transmission adjustment power factor $Pi_{cmd,min}$ [dB] is exceeded in an operation S235 the new i-th re-transmission adjustment power factor $Pi_{cmd,new}$ [dB] is set equal to this minimal allowed i-th re-transmission adjustment power factor $Pi_{cmd,min}$ [dB] and will be employed for the succeeding re-transmission power adjustment period. Otherwise the operational sequence is continued with operation S240.

In an operation S240, a lower limit of the new i-th re-transmission adjustment power factor $Pi_{cmd,new}$ [dB] is checked. In case a minimal allowed i-th re-transmission adjustment power factor $Pi_{cmd,min}$ [dB] is below the 0 dB (being equal to a factor of one) in an operation S245 the new i-th re-transmission adjustment power factor $Pi_{cmd,new}$ [dB] is set equal to 0 dB and will be employed for the succeeding re-transmission power adjustment period. Otherwise the operational sequence is continued with operation S240.

In an operation S250, the allowed upper and lower limits have been check, such that the calculated new i-th re-transmission adjustment power factor $Pi_{cmd,new}$ [dB] is valid and will be employed for the succeeding re-transmission power adjustment period.

Figure 5:
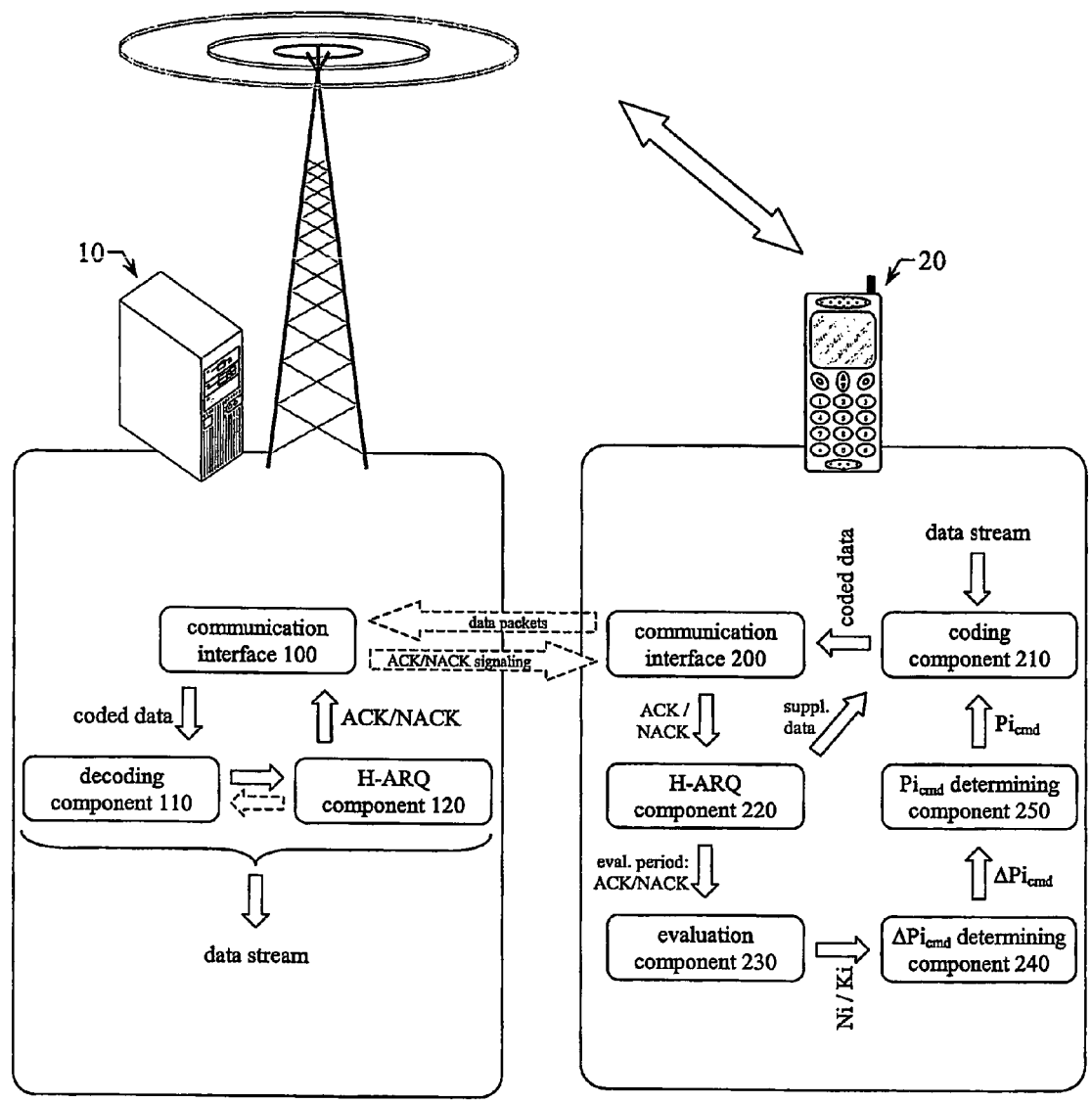
FIG. 5 shows a system of a mobile terminal device (UE) and a base station (BS) employing the power adjustment algorithm for data uplink communication according to an embodiment of the invention.

FIG. 5 shows a system of a mobile terminal device (UE) and a base station (BS) employing the power adjustment algorithm for data uplink communication according to an embodiment of the invention. The illustrated mobile terminal device (20, UE) as well as the base station (10, BS) each includes components and data paths connecting the components allowing for performing an embodiment of the aforementioned method for determining an i-th re-transmission adjustment power command.

A data stream containing data for uplink transmission to a base station (10) and provided from an application processed on the mobile terminal device 20 is supplied to a coding component 210. The coding component 210 may be a component able to channelize and spread data supplied by one ore more DPDCHs (dedicated physical data channels) and corresponding control information supplied by a DPCCH (dedicated physical control channel) in accordance with a CDMA (code division multiple access) system forming an overall wireless communication system such as described with reference to FIG. 2. The channelize and spread data is transmitted as a sequence of data packet by the means of a communication interface 200 to the communication interface 100 of the base station 10. The data packets being based on the original data stream of the data providing or generating application are $1^{st}$ transmission data packets.

On the side of the base station 10, the data packets are decoded by a process being inverse to the aforementioned channnelizing and spreading process resulting in a data stream equal to that provided or generated by the application being operated on the mobile terminal device 10.

Typically, data transmission over a wireless communication system requires an error detection since interference, disturbance and background noise within the frequency band of the wireless communication system may cause a receiving of erroneous data packets at the base station 10. A hybrid automatic repeat request (H-ARQ) process offers a method for requesting supplementary information to correct the received erroneous data for finally decoding the erroneous data by considering the supplementary information. Therefore, a H-ARQ component 120 is implemented in the base station 10. The H-ARQ component 120 provides for transmitting an acknowledgment information to the transmitter of the data packets (herein the mobile terminal device 20) via a ACK/NACK signaling channel for indicating to the transmitter that a certain preceding transmitted data packet is decodable (error-free) and a non-acknowledgment information for indicating to the transmitter that a certain preceding transmitted data packet is not decodable (erroneous).

The mobile terminal device 20 receives an acknowledgment/non-acknowledgment ACK/NACK information signal for each of the previous transmitted data packets via the communication interface 200 and forwards this information to a corresponding H-ARQ component 220 included in the mobile terminal device 20. The H-ARQ component evaluates the received acknowledgment/non-acknowledgment information and in case of a non-acknowledgment information supplementary information in accordance with the employed H-ARQ method and type is supplied to the coding component for example via the same channels (DPDCHs and DPCCH) for coding an data packet being interwoven into the original data packets to be transmitted to the base station 10. For example interwoven data packets serve to be combined with the original received erroneous data packet in order to allow for decoding. The transmission of supplementary information in reaction on a non-acknowledgment information in response to a data packet transmission containing original data ($1^{st}$ transmission of a data packet) is denoted as $1^{st}$ re-transmission. A receiving of a non-acknowledgment information in response to a $1^{st}$ re-transmission is also possible and causes a further transmission of supplementary information designated as $2^{nd}$ re-transmission and so on. According to an embodiment of the present invention, the transmission power of the i-th re-transmission is varied in comparison to the transmission power of the $1^{st}$ transmission. The variation is performed by supplying an i-th re-transmission adjustment power factor $Pi_{cmd}$ to the coding component 210. The i-th re-transmission adjustment power factor $Pi_{cmd}$ is applied on the one or more physical data channels DPDCHs) in case an i-th re-transmission is coded (channelized and spread). An embodiment of the coding component allowing to apply an i-th re-transmission adjustment power factor $Pi_{cmd}$ is described in detail with reference to FIG. 2.

In order to allow the mobile communication device to for determine an i-th re-transmission adjustment power command and apply this i-th re-transmission adjustment power command on an i-th re-transmission a set of M ACK/NACK information received during a re-transmission power adjustment evaluation period by the mobile communication device is forwarded to an evaluation component. The evaluation component is able to determine the first error quantity Ni and the second error quantity Ki from the set of M ACK/NACK information (compare operation S105 or S205 shown in FIG. 3 and FIG. 4b, respectively). Further, the evaluation component 230 checks an absolute difference between an error ratio being a quotient of the second error quantity Ki and the first error quantity Ni and a pre-defined target error rate. In case the absolute difference is below a pre-defined level a currently valid i-th re-transmission adjustment power factor $Pi_{cmd}$ is maintained for being applied to the transmission power of an i-th re-transmission. In case the absolute difference exceeds the pre-defined level an i-th re-transmission adjustment power correction value $\Delta Pi$ is to be determined. The i-th re-transmission adjustment power correction value $\Delta Pi$ is finally combined with the currently valid i-th re-transmission adjustment power factor $Pi_{cmd}$ in order to obtain a new i-th re-transmission adjustment power factor $Pi_{cmd,new}$ to be applied to the coding component 210.

The component 240 for determining the i-th re-transmission adjustment power correction value $\Delta Pi$ compares the error ratio (calculated from the first error quantity Ni and the second error quantity Ki) and the pre-defined target error ratio. The error ratio calculated from to first error quantity Ni and the second error quantity Ki can be understood to be an i-th frame error ratio relating to the i-th re-transmissions (FERi). In case the error ratio is greater the i-th frame error ratio is to be decreased to approach the pre-defined target error ratio which is reached by increasing the i-th re-transmission adjustment power factor $Pi_{cmd}$. In case the error ratio is smaller the i-th frame error ratio is to be increased to approach the pre-defined target error ratio which is reached by decreasing the i-th re-transmission adjustment power factor $Pi_{cmd}$. A corresponding i-th re-transmission adjustment power correction value $\Delta Pi$ is determined by the determining component 240. The determining of the is based on operations S120, S125, S145 and operations S220 shown in FIG. 2 and in FIG. 4b, respectively.

The i-th re-transmission adjustment power correction value $\Delta Pi$ is supplied to a component for determining a new i-th re-transmission adjustment power factor $Pi_{cmd}$. The new i-th re-transmission adjustment power factor $Pi_{cmd,new}$ has to fulfill boundary conditions, i.e. the i-th re-transmission adjustment power factor $Pi_{cmd}$ is limited to a maximum factor and a minimum factor. The maximum value is a factor value equal to one corresponding to a transmission power of an i-th re-transmission equal to a transmission power of a $1^{st}$ transmission. The minimum factor is determined by a pre-defined factor depending on the system. In case the new i-th re-transmission adjustment power factor $Pi_{cmd,new}$ do not fulfill the boundary conditions the new i-th re-transmission adjustment power factor $Pi_{cmd,new}$ is set to the respective boundary condition which it does not fulfill (compare operations S130, S150 in FIG. 2 and operations S230, S240 in FIG. 4b). Finally the new i-th re-transmission adjustment power factor $Pi_{cmd,new}$ is supplied to the coding component for being operable with i-th re-transmissions.

As aforementioned, a couple of automatic repeat request (ARQ) schemes and especially hybrid automatic repeat request (H-ARQ) schemes are available and employed for enhancing the overall transmission quality in wireless communications and cellular wireless communications. The power adjustment control method described in detail above with reference to embodiments of the invention may be suitable to be particularly implemented in conjunction with H-ARQ type I with chase combining, H-ARQ type II with full incremental redundancy (full IR) and H-ARQ type III with partial incremental redundancy (partial IR). Naturally, the above defined listing of suitable ARQ schemes should not limit the invention thereto since those skilled in the art will recognize that the method according to an embodiment of the invention will enhance the functionality of further and future (adopted or related) ARQ schemes resulting in a more efficient transmission error handling and resulting thereto in an enhance overall quality of service (QoS) of communications.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matter of the structure and arrangements of parts within the principles of the present invention to the full extend indicated by the broad general meaning of the terms in which the appended claims are expressed. For example, the particular elements may vary depending on the particular application for the mobile terminal device while maintaining substantially the same functionality without departing from the scope and the spirit of the present invention. Further, although the invention has been illustrated as implemented in operational sequences, those skilled in the art will recognize that the invention may be implemented in any hardware, software or hybrid systems.

What is claimed is:

1. A method comprising:

receiving a pre-defined number of status information items, said status information items each containing at least one of an acknowledgement item and a non-acknowledgement item in accordance with an automatic repeat request associated with an i-th re-transmission during an uplink data transmission between a mobile terminal device and a base station via a code division multiple access system employing said automatic repeat request, said uplink data transmission being operated in a sequence of first transmissions and i-th re-transmissions;

determining a first error quantity and a second error quantity from said pre-defined number of status information items, said first error quantity being equal to a number of i-th re-transmissions, said second error quantity being equal to a number of i-th re-transmissions being responded by status information items each containing said non-acknowledgement item;

determining an error ratio from said first error quantity and said second error quantity; and determining a transmission power factor from a current valid transmission power factor and a transmission power correction factor such that a difference between said error ratio and a pre-defined target error ratio is minimized, wherein said determining of the transmission power factor further comprises:

determining a deviation value of said error ratio from said pre-defined target error ratio;

in case said first error quantity is unequal to zero or said deviation value exceeds a pre-defined deviation level:

determining said transmission power correction factor depending on at least a transmission power correction step value, said first error quantity, said second error quantity and said pre-defined target error ratio; and determining said transmission power factor;

otherwise:

maintaining a current valid transmission power factor being operable with said i-th re-transmission, and further wherein said transmission power correction factor is a product of a first factor, a second factor and a third factor, wherein a value of said first factor is equal to a value out of −1 and +1;

said second factor is defined mathematically as following:

$$\left(\frac{C_{Ni}^{Ki} \cdot FER^{Ki}(1-FER)^{Ni-Ki}}{FER}\right)^{-1}$$

where $C_{Ni}^{Ki}$ is a binomial coefficient, FER is said pre-defined target error ratio, Ni is said first error quantity and Ki is said second error quantity; and said third factor is said transmission power correction step value.

2. The method according to claim 1, wherein said transmission power correction factor increases said transmission power factor in case said error ratio is higher than said pre-defined target error ratio and said transmission power correction factor decreases said transmission power factor in case said error ratio is lower than said pre-defined target error ratio.

3. The method according to claim 1, wherein said error ratio is a ratio of said second error quantity and said first error quantity.

4. The method according to claim 1, wherein said deviation value is an absolute deviation value of a difference between said error ratio and said pre-defined target error ratio and said pre-defined deviation level is a pre-defined system parameter.

5. The method according to claim 1, wherein said pre-defined deviation level depends on said pre-defined target error ratio.

6. The method according to claim 1, said transmission power factor being a transmission power reduction factor, said transmission power factor being defined in relationship to a transmission power being operable with first transmissions, wherein said transmission power is an original transmission power being not adjusted due to one or more further supplementary power control mechanisms.

7. The method according to claim 1, wherein said pre-defined target error ratio is a target frame error ratio.

8. The method according to claim 1, wherein said code division multiple access system is a wideband code division multiple access system, said automatic repeat request is a fast hybrid automatic repeat request, at least one dedicated physical data channel and a dedicated physical control channel are used for uplink data transmission and said transmission power factor is applied selectively on said at least one dedicated physical data channel.

9. A computer program product for determining a transmission power factor, wherein said computer program product is comprising program code sections stored on a computer readable medium for carrying out the method of claim 1, when said computer program product is executed on a processing device, a terminal device, a communication terminal device or a network device.

10. A mobile terminal device for determining a transmission power factor being operable with an i-th re-transmission during an uplink data transmission to a base station, comprising:
a communication interface,
said communication interface transmitting a sequence of individual data packets, said transmitting being operated via a code division multiple access system and using an automatic repeat request,
said communication interface receiving a pre-defined number of status information items each containing at least one of an acknowledgement item and a non-acknowledgement item in accordance with said automatic repeat request;
a component for determining a first error quantity and a second error quantity from said pre-defined number of status information items, said first error quantity being equal to a number of i-th re-transmissions, said second error quantity being equal to a number of i-th re-transmissions being responded by status information items each containing said non-acknowledgement item;
a component for determining an error ratio from said first error quantity and said second error quantity; and
a component for determining a transmission power factor from a current valid transmission power factor and a transmission power correction factor in order to minimize a difference between said error ratio and a pre-defined target error ratio,
wherein said component for determining a transmission power factor is further configured:
to determine a deviation value of said error ratio from said pre-defined target error ratio;
in case said first error quantity is unequal to zero or said deviation value exceeds a pre-defined deviation level:
to determine said transmission power correction factor depending on at least a transmission power correction step value, said first error quantity, said second error quantity and said pre-defined target error ratio; and
to determine said transmission power factor;
otherwise:
to maintain a current valid transmission power factor being operable with said i-th re-transmission, and
further wherein said transmission power correction factor is a product of a first factor, a second factor and a third factor, wherein
a value of said first factor is equal to a value out of −1 and +1;
said second factor is defined mathematically as following:

$$\left(\frac{C_{Ni}^{Ki} \cdot FER^{Ki}(1-FER)^{Ni-Ki}}{FER}\right)^{-1}$$

where $C_{Ni}^{Ki}$ is a binomial coefficient, FER is said pre-defined target error ratio, Ni is said first error quantity and Ki is said second error quantity; and said third factor is said transmission power correction step value.

11. A system allowing for determining a transmission power factor being operable with an i-th re-transmission during an uplink data transmission from a mobile terminal device to a base station,
said mobile terminal device comprising:
a communication interface,
said communication interface transmitting a sequence of individual data packets, said transmitting being operated via a code division multiple access system and using an automatic repeat request,
said communication interface receiving a pre-defined number of status information items each containing at least one of an acknowledgement item and a non-acknowledgement item in accordance with said automatic repeat request;
a component for determining a first error quantity and a second error quantity from said pre-defined number (M) of status information items, said first error quantity being equal to a number of i-th re-transmissions, said second error quantity being equal to a number of i-th re-transmissions being responded by status information items each containing said non-acknowledgement item;
a component for determining an error ratio from said first error quantity and said second error quantity; and a component for determining a transmission power factor from a current valid transmission power factor and a transmission power correction factor in order to minimize a difference between said error ratio and a pre-defined target error ratio
wherein said component for determining a transmission power factor is further configured:
to determine a deviation value of said error ratio from said pre-defined target error ratio;
in case said first error quantity is unequal to zero or said deviation value exceeds a pre-defined deviation level:
to determine said transmission power correction factor depending on at least a transmission power correction step value, said first error quantity, said second error quantity and said pre-defined target error ratio; and
to determine said transmission power factor;
otherwise:
to maintain a current valid transmission power factor being operable with said i-th re-transmission, and
further wherein said transmission power correction factor is a product of a first factor, a second factor and a third factor, wherein
a value of said first factor is equal to a value out of −1 and +1;
said second factor is defined mathematically as following:

$$\left( \frac{C_{Ni}^{Ki} \cdot FER^{Ki}(1-FER)^{Ni-Ki}}{FER} \right)^{-1}$$

where $C_{Ni}^{Ki}$ is a binomial coefficient, FER is said pre-defined target error ratio, Ni is said first error quantity and Ki is said second error quantity; and said third factor is said transmission power correction step value;
said base station comprising:
a communication interface,
said communication interface receiving said sequence of individual data packets from said mobile terminal device; and
said communication interface transmitting said status information items to said mobile terminal device, said status information items being based on said automatic repeat request.

\* \* \* \* \*

UNITED STATES PATENT AND TRADEMARK OFFICE
CERTIFICATE OF CORRECTION

PATENT NO. : 7,573,860 B2  Page 1 of 1
APPLICATION NO. : 10/534011
DATED : August 11, 2009
INVENTOR(S) : Zhuyan Zhao, Hong Ming Zheng and Hao Guan It is certified that error appears in the above-identified patent and that said Letters Patent is hereby corrected as shown below:

On the Title Page, Item (75) the name of the second named inventor is spelled incorrectly. Please remove "Hongmming Zheng" and replace with
--Hong Ming Zheng--.

Signed and Sealed this

Twenty-seventh Day of October, 2009

David J. Kappos
*Director of the United States Patent and Trademark Office*